US006046449A

United States Patent [19]
Chien

[11] Patent Number: 6,046,449
[45] Date of Patent: Apr. 4, 2000

[54] TRANSPARENT PLANAR BOARD OF A FLATBED SCANNER AFFIXED BY CLASPS

[75] Inventor: Chuwn-Jen Chien, Taipei, Taiwan

[73] Assignee: Primax Electronics Ltd., Taipei Hsien, Taiwan

[21] Appl. No.: 09/078,363

[22] Filed: May 13, 1998

[51] Int. Cl.[7] .................................................. H01J 3/14
[52] U.S. Cl. .......................... 250/235; 250/234; 250/239; 250/208.1; 348/373; 358/505; 358/506; 358/400; D14/116
[58] Field of Search .................................... 250/234, 235, 250/208.1, 239; 348/373, 376; 358/505, 506, 400; D14/116

[56] References Cited

U.S. PATENT DOCUMENTS 5,235,168  8/1993  Bobba ................................. 250/462.43
5,661,297  8/1997  Aleshire et al. ......................... 250/239

Primary Examiner—Edward P. Westin
Assistant Examiner—Glenn T Kinnear
Attorney, Agent, or Firm—Winston Hsu

[57] ABSTRACT

The present invention provides a housing comprising a rectangular transparent planar board for placing documents to be scanned and a rectangular case for placing a scanning module. The housing comprises a plurality of clasps for fixing the transparent planar board within a flatbed scanner and comprises front, rear, left and right ends. The case comprises four upright sides and a rectangular opening installed above the four upright sides for mounting the transparent planar board. The opening comprises front, rear, left and right sides. The left and right sides of the opening each comprises an L-shaped groove for mounting the left and right ends of the transparent planar board, respectively. The front and rear sides of the opening each comprises a clasp for mounting the front and rear ends of the transparent planar board. The clasp at the middle portion of the rear side is installed such that when the front end of the transparent planar board is fastened into the clasp installed at the front side of the opening, the middle portion of the rear end of the transparent planar board can be fastened into the clasp installed at the rear side of the opening by temporarily displacing the clasp laterally as the transparent planar board is placed.

6 Claims, 5 Drawing Sheets

TRANSPARENT PLANAR BOARD OF A FLATBED SCANNER AFFIXED BY CLASPS

BACKGROUND OF THE INVENTION

1. Field of the Invention

The present invention relates to a housing of a flatbed scanner, and more particularly, to a housing of a flatbed scanner which uses a plurality of clasps for fixing its transparent planar board.

2. Description of the Prior Art

A prior art flatbed scanner has a rectangular transparent planar board made of glass for placing documents to be scanned and a rectangular case with a recess for placing a scanning module or other components. The case comprises a bottom casing and a top casing. The top casing comprises a rectangular opening in the middle portion of its surface for installing a transparent planar board. The transparent planar board is commonly fixed to the opening of the top casing by double-sided tape to prevent dust and impurities from entering and causing damage to the scanner. However, this method is not only costly but also causes problems over the long term when the double-sided tape ages and begins to disintegrate because of external influences such as temperature extremes, humidity and stress. This often leads to instability of the transparent planar board.

SUMMARY OF THE INVENTION

It is therefore a primary objective of the present invention to provide a housing of a flatbed scanner to solve the above mentioned problem.

In a preferred embodiment, the present invention provides a scanning device comprising:

- a rectangular transparent planar board having a front end, a rear end, a left end, and a right end for placing documents to be scanned; and
- a rectangular case comprising four upright sides for placing a scanning module and a rectangular opening installed above the four upright sides having a front side, a rear side, a left side and a right side for mounting the transparent planar board, furthermore, the left and right sides of the opening each comprising an L-shaped groove for mounting the left and right ends of the transparent planar board and the front and rear sides of the opening each comprising a clasp for mounting the front and rear ends of the transparent planar board;

wherein the clasps installed at the rear side of the opening are installed in the middle portion of the rear side of the opening, and when the front end of the transparent planar board is fastened into the clasp installed at the front side of the opening, the middle portion of the rear end of the transparent planar board can be fastened into the clasp installed at the rear side of the opening by temporarily displacing the clasp as the transparent planar board is placed.

It is an advantage of the present invention that the housing of the flatbed scanner has a simple structure, has a transparent planar board fixed in a stable fashion to the case, and has a reduced cost and a simple assembly procedure.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
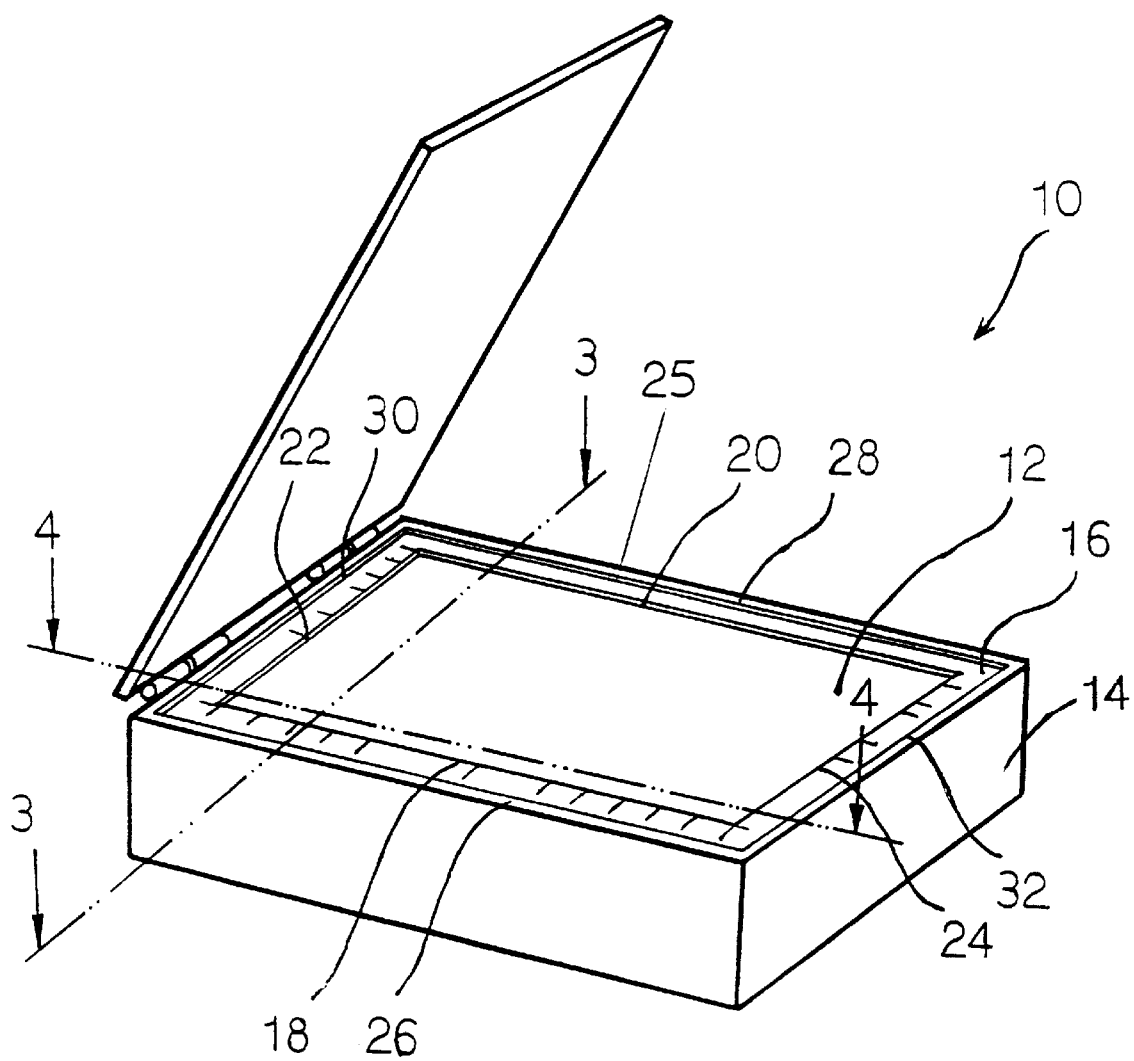
FIG. 1 is a perspective view of a housing of a flatbed scanner according to the present invention.

Please refer to FIG. 1. FIG. 1 is a perspective view of a housing 10 of a flatbed scanner according to the present invention. The housing 10 comprises a rectangular transparent planar board 12, a plastic rectangular case 14, and a rectangular frame 16. The transparent planar board 12 comprises a front end 18, a rear end 20, a left end 22, and a right end 24 for placing documents to be scanned. The case 14 comprises four upright sides for placing a scanning module and a rectangular opening 25 having a front side 26, a rear side 28, a left side 30, and a right side 32 for mounting the corresponding front, rear, left and right ends 18, 20, 22, 24 of the transparent planar board 12. The rectangular frame 16 is attached to the opening 25 and the transparent planar board 12 to seal the intervening gaps.

Figure 2:
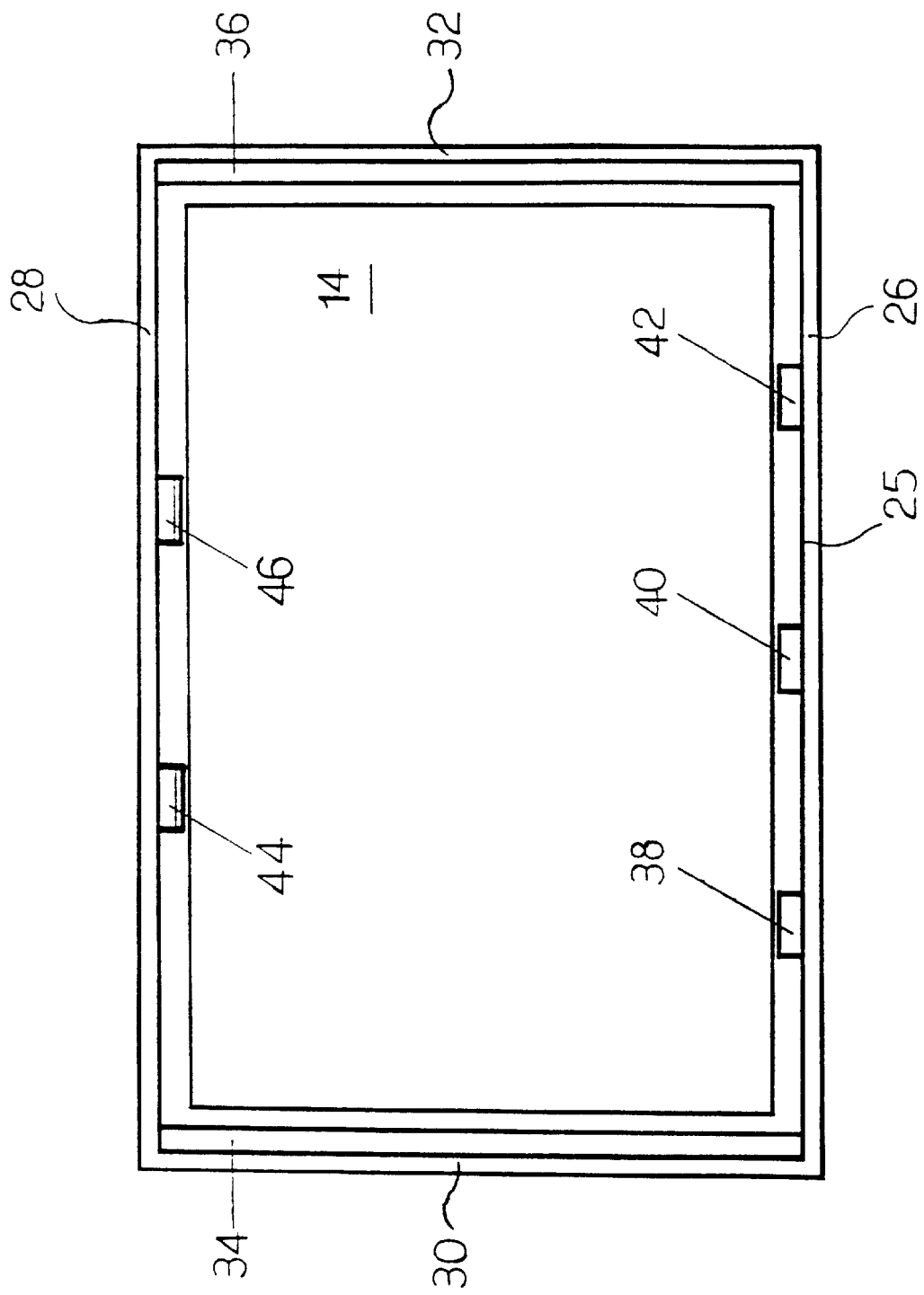
FIG. 2 is a top view of the case of the housing shown in FIG. 1.
Figure 3:
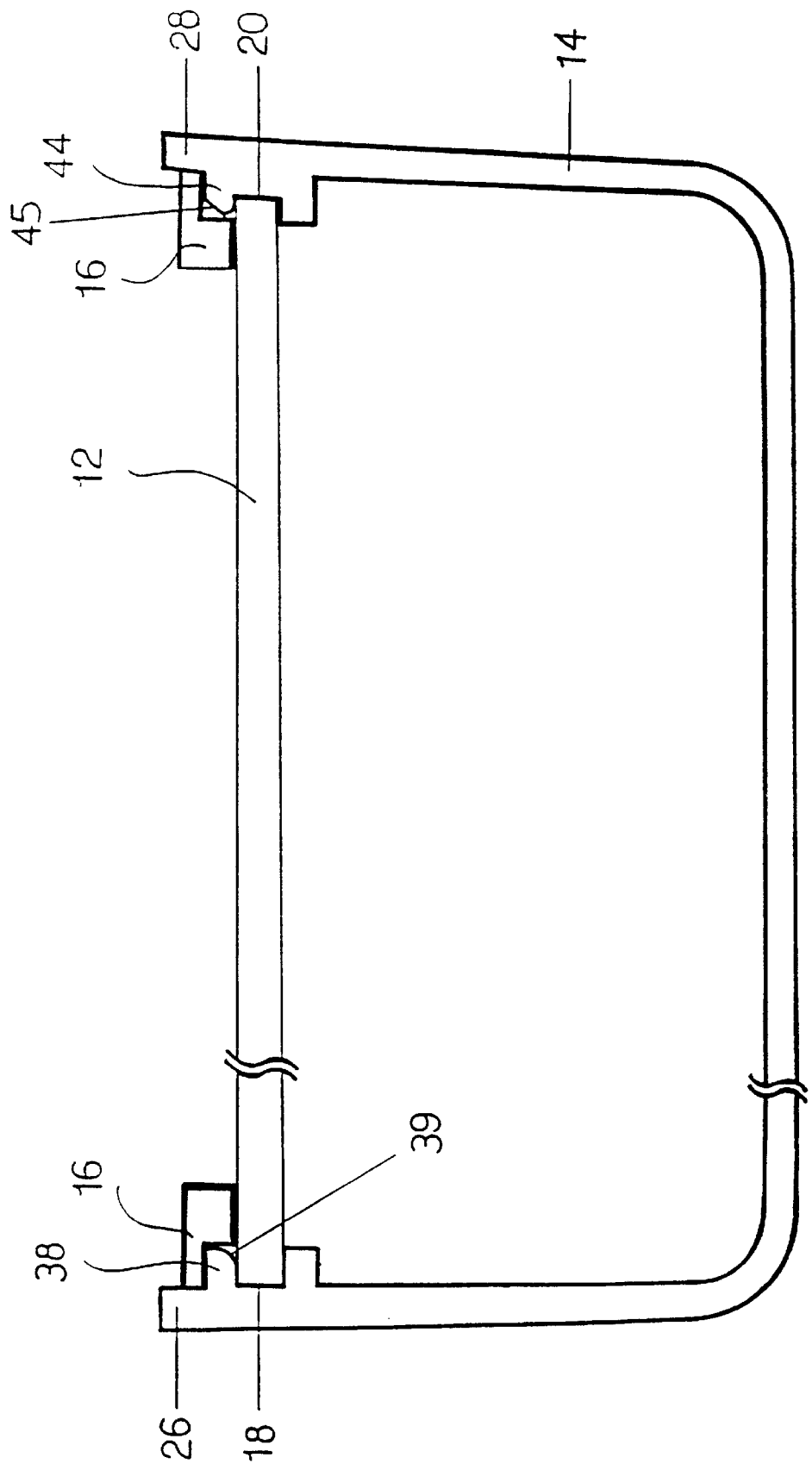
FIG. 3 is a sectional view along line 3-3 of the housing shown in FIG. 2.
Figure 4:
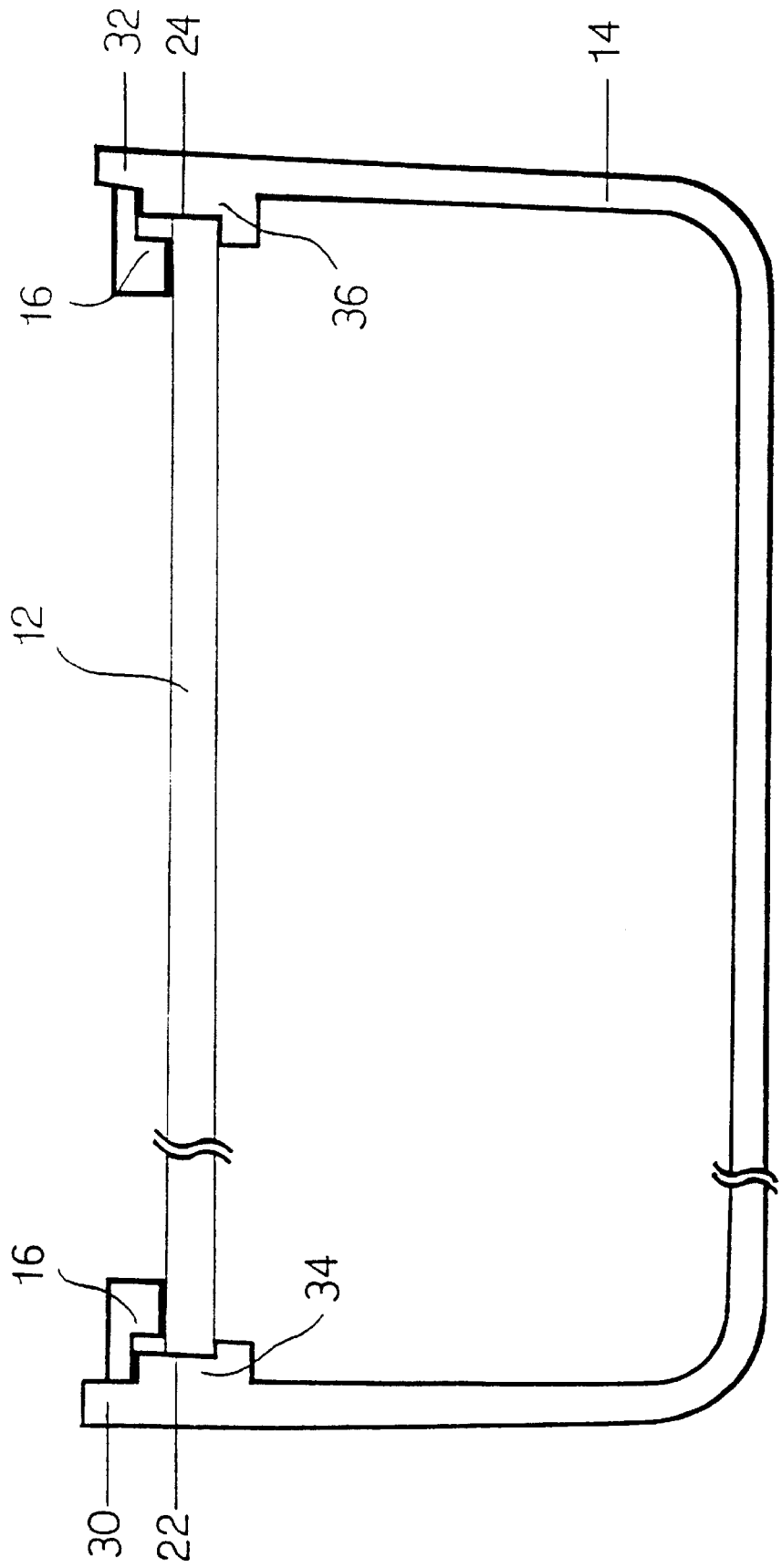
FIG. 4 is a sectional view along line 4-4 of the housing shown in FIG. 3.
Figure 5:
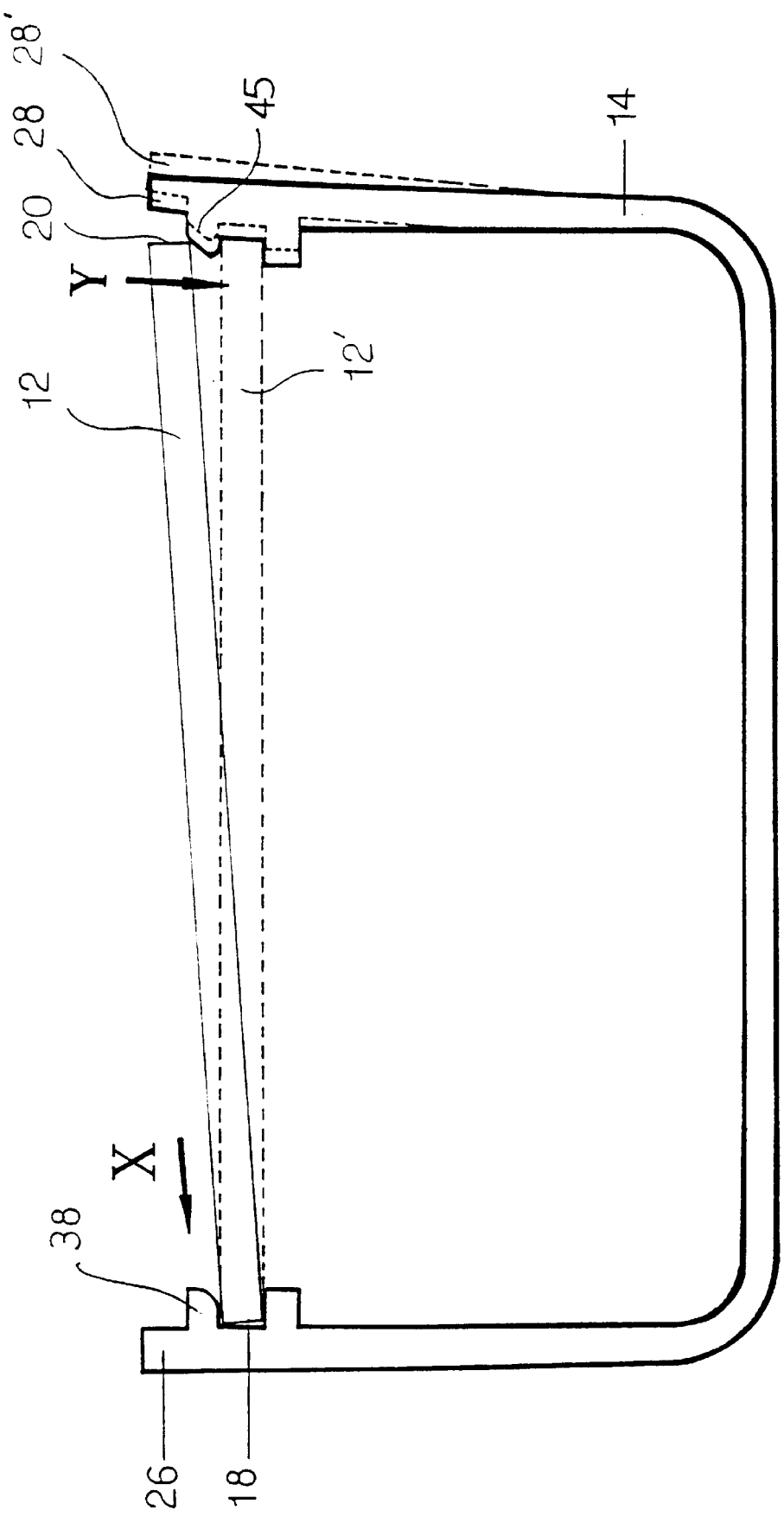
FIG. 5 is a illustrative diagram of connecting the transparent planar board to the housing shown in FIG. 1.

Please refer to FIG. 2 to FIG. 5. FIG. 2 is a top view of the case 14 of the housing 10 shown in FIG. 1. FIG. 3 is a sectional view along line 3—3 of the housing 10 shown in FIG. 3. FIG. 4 is a sectional view along line 4—4 of the housing 10 shown in FIG. 3. FIG. 5 is a illustrative diagram of attaching the transparent planar board to the housing shown in FIG. 1. Both the left and right sides 30, 32 have an L-shaped groove 34, 36 for separately fixing the left and right ends 22, 24 of the transparent planar board 12 (shown in FIG. 2 and FIG. 4). FIG. 2 and FIG. 3 show that a set of clasps 38, 40 and 42 are installed at the front side 26 of the opening 25 for fixing the front end 18 of the transparent planar board 12, and another set of clasps 44 and 46 are installed in the middle portion of the rear side 28 for fixing the rear end 20. The rectangular frame 16, shown in FIG. 3 and FIG. 4, is attached to the opening 25 above the transparent planar board 12 for sealing the gaps between the opening 25 and the transparent planar board 12 thus preventing the document from contacting the clasps.

From FIG. 3 it is apparent that clasps 38, 40 and 42 have a curved edge 39 at their openings and the curved edge 39 can facilitate the process of sliding the front end 18 into the clasp 38. Both clasps 44 and 46 have a ramp 45 on their top portions so that when the front end 18 of the transparent planar board 12 is fastened into the three clasps 38, 40 and 42 along the horizontal direction, the rear end 20 of transparent planar board 12 can be pressed along the vertical direction temporarily displacing the middle portion of the rear side 28 thus allowing the rear end 20 to be fastened down by the clasps 44 and 46 along the ramp 45.

The opening 25 of the rectangular case 14 is greater in length in its front and rear dimensions. The two clasps 44 and 46 installed in the middle portion of the rear side 28 of the opening 25 can be easily displaced for enabling the rear end 20 of the transparent planar board 12 to be inserted into the clasps 44 and 46 installed at the rear side 28 of the opening 25. FIG. 5 shows that once the front end 18 of the transparent planar board 12 is inserted into the clasp 38, downward vertical pressure exerted on the rear end 20 of the transparent planar board 12 will temporarily displace the middle portion of the rear side 28 outward so that the rear end 20 of the transparent planar board 12 can be inserted into the clasps 44 and 46. The left and right ends 22, 24 of the transparent planar board 12 will be fixed by the L-shaped grooves 34, 36 of the left and right sides 30, 32 thus stabilizing the four ends of the transparent planar board 12 at the opening 25.

From the above mentioned embodiment, in contrast to the prior aft flatbed scanner where double-sided tape is used, the housing 10 of the present invention uses two sets of clasps installed at the front and rear sides 26 and 28, respectively, to fix the transparent planar board 12 in place. This effectively solves the problem of long-term disintegration of the double-sided tape secondary to external factors such as temperature changes, humidity and stress. The present technique lowers costs as well.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A housing of a flatbed scanner comprising:
   a rectangular and transparent planar board having a front end, a rear end, a left end, and a right end for placing documents to be scanned; and
   a rectangular case for placing a scanning module of the scanner comprising four upright sides and a rectangular opening installed above the four upright sides having a front side, a rear side, a left side and a right side for mounting the transparent planar board, the left and right sides of the opening each comprising an L-shaped groove for mounting the left and right ends of the transparent planar board, and the front and rear sides of the opening each comprising at least one clasp for mounting the front and rear ends of the transparent planar board;
   wherein the clasps installed at the rear side of the opening are installed approximately around the middle portion of the rear side of the opening, and when the front end of the transparent planar board is inserted into the clasp installed at the front side of the opening, the middle portion of the rear end of the transparent planar board can be inserted into the clasp installed at the rear side of the opening by temporarily displacing the middle portion of the rear side outward.

2. The housing of claim 1 wherein the clasp installed at the rear side of the opening has a ramp on its top end, and wherein when the front end of the transparent planar board is inserted into the clasp installed at the front side, the rear end of the transparent planar board can be vertically depressed against the ramp of the clasp installed at the rear side so that it can be slipped into the clasp installed at the rear side of the opening.

3. The housing of claim 1 wherein the rectangular case is made of plastic.

4. The housing of claim 1 wherein the transparent planar board is made of glass.

5. The housing of claim 1 further comprising a rectangular frame attached to the opening above the transparent planar board for sealing the gaps between the opening and the transparent planar board.

6. The housing of claim 1 wherein the opening of the rectangular case is greater in length in its front and rear dimensions, and wherein the clasp installed in the middle portion of the rear side of the opening can be easily displaced for enabling the rear end of the transparent planar board to be inserted into the clasp installed at the rear side of the opening.

* * * * *